Patented Dec. 12, 1922.

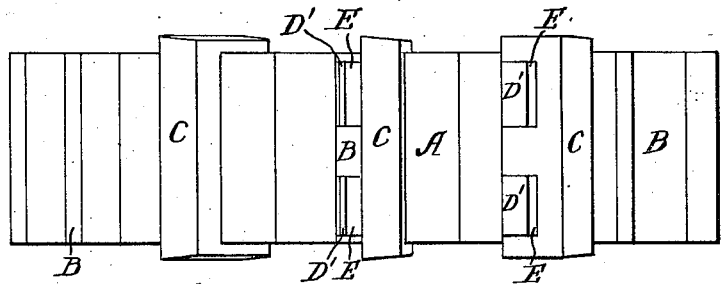
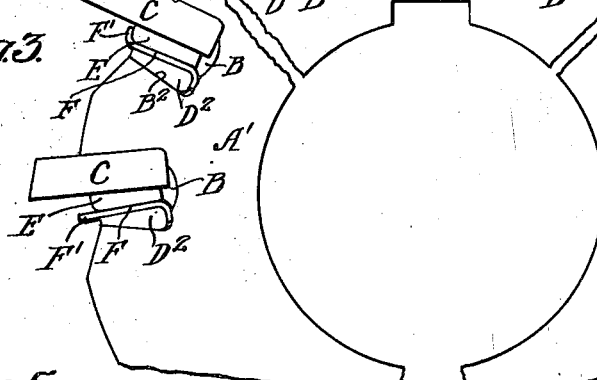
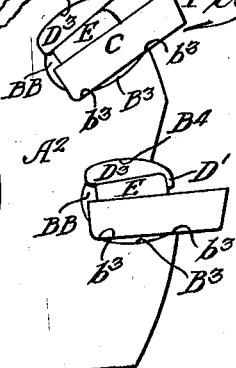
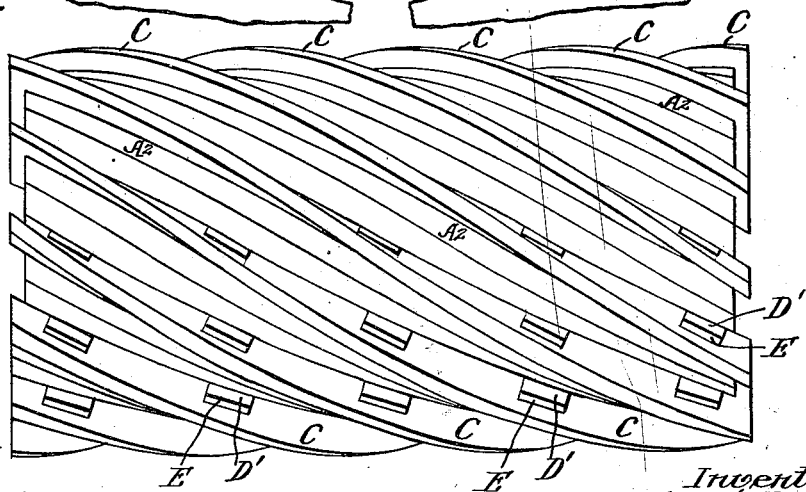

1,438,184

UNITED STATES PATENT OFFICE.

WILFRED LEWIS, OF HAVERFORD, PENNSYLVANIA.

FASTENING DEVICE FOR REMOVABLE CUTTER BLADES.

Application filed November 2, 1921. Serial No. 512,226.

*To all whom it may concern:*

Be it known that I, WILFRED LEWIS, a citizen of the United States of America, and resident of Haverford, in the county of Montgomery, in the State of Pennsylvania, have invented certain new and useful Improvements in Fastening Devices for Removable Cutter Blades, of which the following is a true and exact description, reference being had to the accompanying drawings, which form a part thereof.

My invention relates to saws or milling cutters provided with removable cutting blades, and particularly to the means by which the cutter blades are held in the body of the tool. The object of my invention is to provide a device at once simple, inexpensive and secure, for holding the cutter blades in proper position and one which will permit the ready removal and replacement of the teeth.

The nature of my invention will be best understood as described in connection with the drawings in which it is illustrated and in which—

Figure 1 is a face view of a milling cutter with straight parallel teeth, three of which are shown in connection with the body of the cutter.

Figure 2 is a fragmentary view showing in side elevation a portion of the milling cutter shown in Fig. 1 with the three teeth secured in position by my improved mechanism.

Figure 3 is a similar fragmentary side elevation showing a modification of the device shown in Fig. 2.

Figure 4 is a similar fragmentary side elevation showing the application of my invention to milling cutters having helically set teeth and Figure 5 is a plan view on a reduced scale of a milling cutter having helically set teeth secured in position in the body of the cutter by the means indicated in Fig. 4.

A, Figs. 1 and 2, indicates the body of the milling cutter having formed in it recesses indicated at B, B, etc., which recesses, as shown, are formed with undercut sides B' and B². C, C etc., indicate the cutter blades which are set up against the sides B' of the undercut slots. D, D, etc., are outwardly tapered wedges which are set against the sides B² of the undercut slots and which are formed or provided with bendable tongues D' at their outer ends, these tongues projecting beyond the slots B as indicated. E, E, etc. are inwardly tapered wedges which are driven in between the wedges D and the cutter blades C. Fig. 2 shows progressively from left to right the process of driving in the wedges E and securing them in position when fully driven in by bending over their tops the tongues D' as indicated at the right-hand side of Fig. 2.

In the modification shown in Fig. 3 the outwardly tapered wedges, here indicated at D², are made without integrally formed bendable tongues D' and a thin plate or a shim of metal indicated at F and provided with a bendable projecting end F' is set up against the side of the wedge D² and bent over the head of the inwardly tapered wedge E when it is driven into place as indicated at the top of Fig. 3. This is manifestly the full equivalent for the construction shown in Fig. 2, and I may mention that the use of the shim F in addition to the wedges used for holding the cutter blades in position will even be advantageous particularly when it becomes necessary to redress and somewhat enlarge the slots B. For this purpose, of course, it is immaterial in what position the shim is located.

In Fig. 4 the helical slots indicated at BB are formed as shown and described in my Patent 1,014,658 of January 16, 1912, and the walls indicated at B³ and B⁴ are concavely curved, and by preference the curved wall B³ is dressed off so as to have parallel surfaces, as indicated at b³ b³, against which the cutter C will rest. The outwardly tapered wedge used with this construction and indicated at D³ should have a curved face fitting against the curved wall B⁴ of the slot and is provided as shown with a bendable end D' which is bent over the wedge E after it is driven into place as shown at the bottom of Fig. 4.

Having now described my invention, what I claim as new and desire to secure by Letters Patent, is:

1. A milling cutter having a body provided with cutter holding slots with undercut sides, in combination with cutter blades fitted against one side of the slots, outwardly tapered wedges fitted against the other sides of the slots, bendable tongues extending beyond the outer ends of the said wedges and firmly attached thereto in the assembled cutter, and inwardly tapered wedges driven into the space between the outwardly tapered wedges and the blades, so as to press the said wedges and blades against the undercut sides of the slot, said inwardly tapered wedges being held in position by bending the tongues over their heads.

2. A milling cutter having a body provided with cutter holding slots with undercut sides in combination with cutter blades fitted against one side of the slots, outwardly tapered wedges fitted against the other sides of the slots, said wedges having bendable tongues at their outer ends and inwardly tapered wedges driven in between the outwardly tapered wedges and the blades and held in position by bending the tongue of the outwardly tapered wedges over their heads.

WILFRED LEWIS.